US012413013B2

(12) United States Patent
Kojima et al.

(10) Patent No.: US 12,413,013 B2
(45) Date of Patent: Sep. 9, 2025

(54) SHIELDED ELECTRICALLY CONDUCTIVE CABLE CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Kojima, Mie (JP); Atsushi Murata, Mie (JP); Kazuaki Hamada, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 414 days.

(21) Appl. No.: 17/922,149

(22) PCT Filed: Apr. 23, 2021

(86) PCT No.: PCT/JP2021/016420
§ 371 (c)(1),
(2) Date: Oct. 28, 2022

(87) PCT Pub. No.: WO2021/230039
PCT Pub. Date: Nov. 18, 2021

(65) Prior Publication Data

US 2023/0178928 A1 Jun. 8, 2023

(30) Foreign Application Priority Data

May 14, 2020 (JP) ................................ 2020-085129

(51) Int. Cl.
*H01R 13/00* (2006.01)
*H01B 7/22* (2006.01)
(Continued)

(52) U.S. Cl.
CPC ............ *H01R 13/56* (2013.01); *H01B 7/228* (2013.01); *H01R 13/6592* (2013.01)

(58) Field of Classification Search
CPC .. H01R 13/6592; H01R 24/46; H01R 24/525; H01R 2103/00
See application file for complete search history.

(56) References Cited

U.S. PATENT DOCUMENTS

2017/0214153 A1* 7/2017 Hamada ............... H02G 15/025
2020/0014129 A1 1/2020 Hamada et al.
(Continued)

FOREIGN PATENT DOCUMENTS

JP 2002-216916 A 8/2002
JP 2010-170934 A 8/2010
(Continued)

OTHER PUBLICATIONS

International Search Report issued on Jul. 6, 2021 for WO 2021/230039 A1 (6 pages).

*Primary Examiner* — Phuong Chi Thi Nguyen
(74) *Attorney, Agent, or Firm* — Venjuris, P.C.

(57) ABSTRACT

A shielded electrically conductive path is provided with a shield terminal including an inner conductor and an outer conductor surrounding the inner conductor, a shielded cable including a core wire fixed to a rear end part of the inner conductor, a braided wire surrounding the core wire and a sheath surrounding the braided wire, and a sleeve mounted on an outer periphery of a front end part of the sheath. In a front end part of the shielded cable, the braided wire extending from a front end of the sheath is folded rearward (Continued)

and put on an outer periphery of the sleeve and a crimping portion in a rear end part of the outer conductor is crimped to the sleeve while surrounding an outer periphery of a folded portion of the braided wire.

8 Claims, 5 Drawing Sheets

(51) Int. Cl.
*H01R 13/56* (2006.01)
*H01R 13/6592* (2011.01)

(56) References Cited

U.S. PATENT DOCUMENTS

| | | | |
|---|---|---|---|
| 2022/0013971 | A1 | 1/2022 | Hamada et al. |
| 2022/0069533 | A1 | 3/2022 | Hamada et al. |
| 2022/0115822 | A1 | 4/2022 | Maesoba et al. |

FOREIGN PATENT DOCUMENTS

| | | | |
|---|---|---|---|
| JP | 2011-023245 | A | 2/2011 |
| WO | 2021/029201 | A1 | 2/2021 |

* cited by examiner

SHIELDED ELECTRICALLY CONDUCTIVE CABLE CONNECTOR

CROSS REFERENCE TO RELATED APPLICATIONS

This application is a national phase of PCT application No. PCT/JP2021/016420, filed on 23 Apr. 2021, which claims priority from Japanese patent application No. 2020-085129, filed on 14 May 2020, all of which are incorporated herein by reference.

TECHNICAL FIELD

The present disclosure relates to a shielded electrically conductive path.

BACKGROUND

Patent Document 1 discloses a structure for connecting such a terminal fitting that an inner conductor terminal is surrounded with an outer conductor terminal and a shielded cable. The shielded cable includes a core wire, a braided wire surrounding the core wire and an outer sheath surrounding the braided wire. In a front end part of the shielded cable, a ring member is externally fit to the outer periphery of the outer sheath and a front end part of the braided wire is folded rearward and put on the outer periphery of the ring member. A barrel portion in a rear end part of the outer conductor terminal is crimped to the ring member while being held in close contact with the outer periphery of the braided wire and the crimped ring member is held in close contact with the outer periphery of the outer sheath, whereby the outer conductor terminal is fixed to the front end part of the shielded cable.

PRIOR ART DOCUMENT

Patent Document

Patent Document 1: JP 2015-226383 A

SUMMARY OF THE INVENTION

Problems to be Solved

In recent years, a higher transmission speed is required in transmission circuits of automotive vehicles. To improve and stabilize communication performance in high-speed transmission, it is necessary to keep an interval between a core wire and a braided wire constant and achieve impedance matching by preventing the deformation of a shielded cable. If a barrel portion of an outer conductor terminal is strongly crimped to a ring member, the shielded cable is deformed to be squeezed in a radial direction. To avoid a reduction in communication performance, a crimping force of the barrel portion needs to be suppressed.

However, if the crimping force of the barrel portion is weakened, a slip occurs between the outer peripheral surface of the outer sheath and the inner peripheral surface of the ring member and the shielded cable is relatively displaced rearward with respect to the outer conductor terminal and the inner conductor terminal when the shielded cable is pulled rearward. Thus, a load concentrates on a connected part of the inner conductor terminal and the core wire, whereby the core wire may come out from the inner conductor terminal or may be broken. Therefore, communication performance is reduced if the connection reliability of the terminal fitting and the shielded cable is prioritized.

A shielded electrically conductive path of the present disclosure was completed on the basis of the above situation and aims to prevent a reduction in communication performance.

Means to Solve the Problem

The present disclosure is directed to a shielded electrically conductive path with a shield terminal including an inner conductor and an outer conductor surrounding the inner conductor, a shielded cable including a core wire fixed to a rear end part of the inner conductor, a braided wire surrounding the core wire and a sheath surrounding the braided wire, and a sleeve mounted on an outer periphery of a front end part of the sheath, the braided wire extending from a front end of the sheath being folded rearward and put on an outer periphery of the sleeve and a crimping portion in a rear end part of the outer conductor being crimped to the sleeve while surrounding an outer periphery of a folded portion of the braided wire in a front end part of the shielded cable, and a front end of the sleeve being located at the same position as or forward of the front end of the sheath in a front-rear direction.

Effect of the Invention

According to the present disclosure, it is possible to prevent a reduction in communication performance.

DETAILED DESCRIPTION TO EXECUTE THE INVENTION

Description of Embodiments of Present Disclosure

Figure 1:
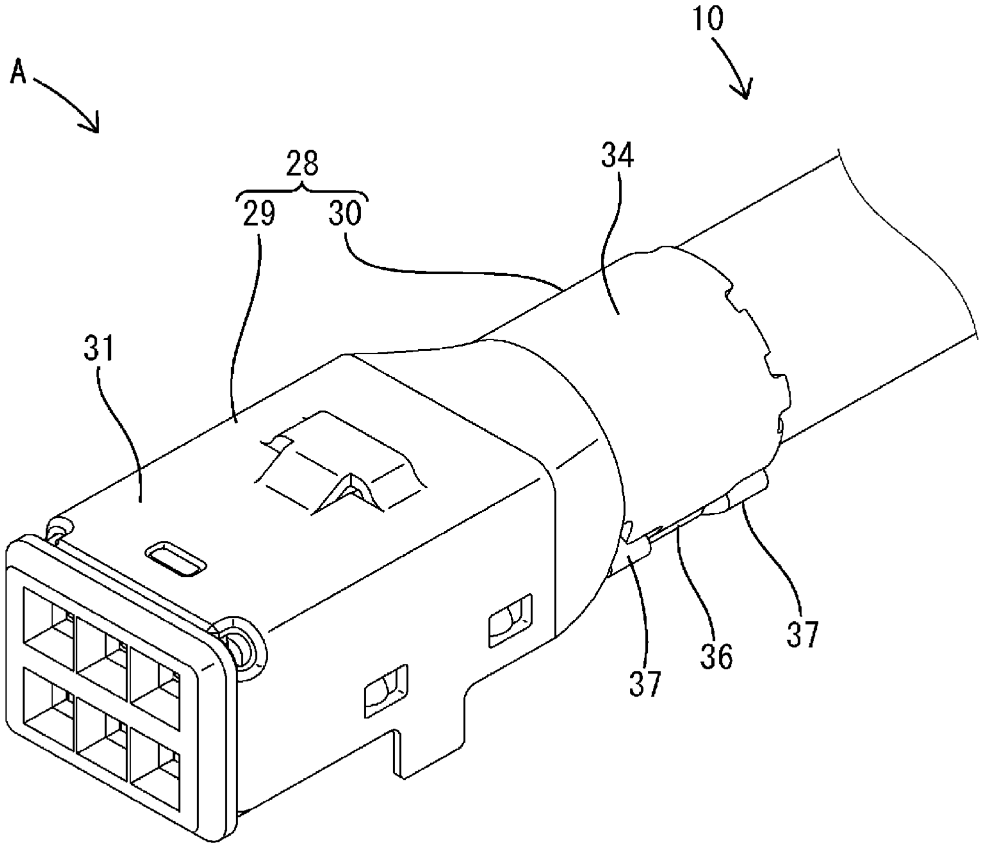
FIG. 1 is a perspective view of a shielded electrically conductive path of a first embodiment.

First, embodiments of the present disclosure are listed and described.

(1) The shielded electrically conductive path of the present disclosure is provided with a shield terminal including an inner conductor and an outer conductor surrounding the inner conductor, a shielded cable including a core wire fixed to a rear end part of the inner conductor, a braided wire surrounding the core wire and a sheath surrounding the braided wire, and a sleeve mounted on an outer periphery of a front end part of the sheath, the braided wire extending from a front end of the sheath being folded rearward and put on an outer periphery of the sleeve and a crimping portion in a rear end part of the outer conductor being crimped to the sleeve while surrounding an outer periphery of a folded portion of the braided wire in a front end part of the shielded cable, and a front end of the sleeve being located at the same position as or forward of the front end of the sheath in a front-rear direction.

According to the configuration of the present disclosure, if a crimping force by the crimping portion is reduced to avoid a reduction in communication performance, the shielded cable is relatively displaced rearward with respect to the outer conductor when a rearward pulling force is applied to the shielded cable. However, at the time of or immediately after the start of a relative displacement of the shielded cable, a bent portion on the front end of the folded portion of the braided wire is caught by the front end of the sleeve. Thus, a rearward relative displacement of the shielded cable is hindered. Therefore, a reduction in communication performance can be prevented while a connected state of the shield terminal and the shielded cable is maintained.

(2) Preferably, an expanded diameter portion having a diameter increasing toward front is formed in a front end part of the sleeve. According to this configuration, even if the sleeve is relatively displaced rearward with respect to the crimping portion when a rearward pulling force is applied to the shielded cable, an outer periphery of the expanded diameter portion is caught by the crimping portion, whereby a rearward relative displacement of the sleeve with respect to the crimping portion is prevented.

(3) Preferably, in (2), a rear end of the expanded diameter portion is located rearward of the front end of the sheath. According to this configuration, when a rearward pulling force is applied to the shielded cable, the front end part of the sheath is caught by the inner peripheral surface of the expanded diameter portion, whereby a rearward relative displacement of the shielded cable can be prevented.

(4) Preferably, the crimping portion is formed with a biting portion configured to come into contact with and bite into the sheath. According to this configuration, a rearward relative displacement of the shielded cable with respect to the shield terminal can be prevented by the biting action of the biting portion.

(5) Preferably, the front end of the sleeve is located forward of the front end of the sheath, and the sleeve is formed with a cut portion for exposing the front end of the sheath to an outer peripheral surface side of the sleeve. According to this configuration, a positional relationship of the front end of the sleeve and the front end of the sheath can be confirmed through the cut portion.

Details of Embodiments of Present Disclosure

First Embodiment

Figure 2:
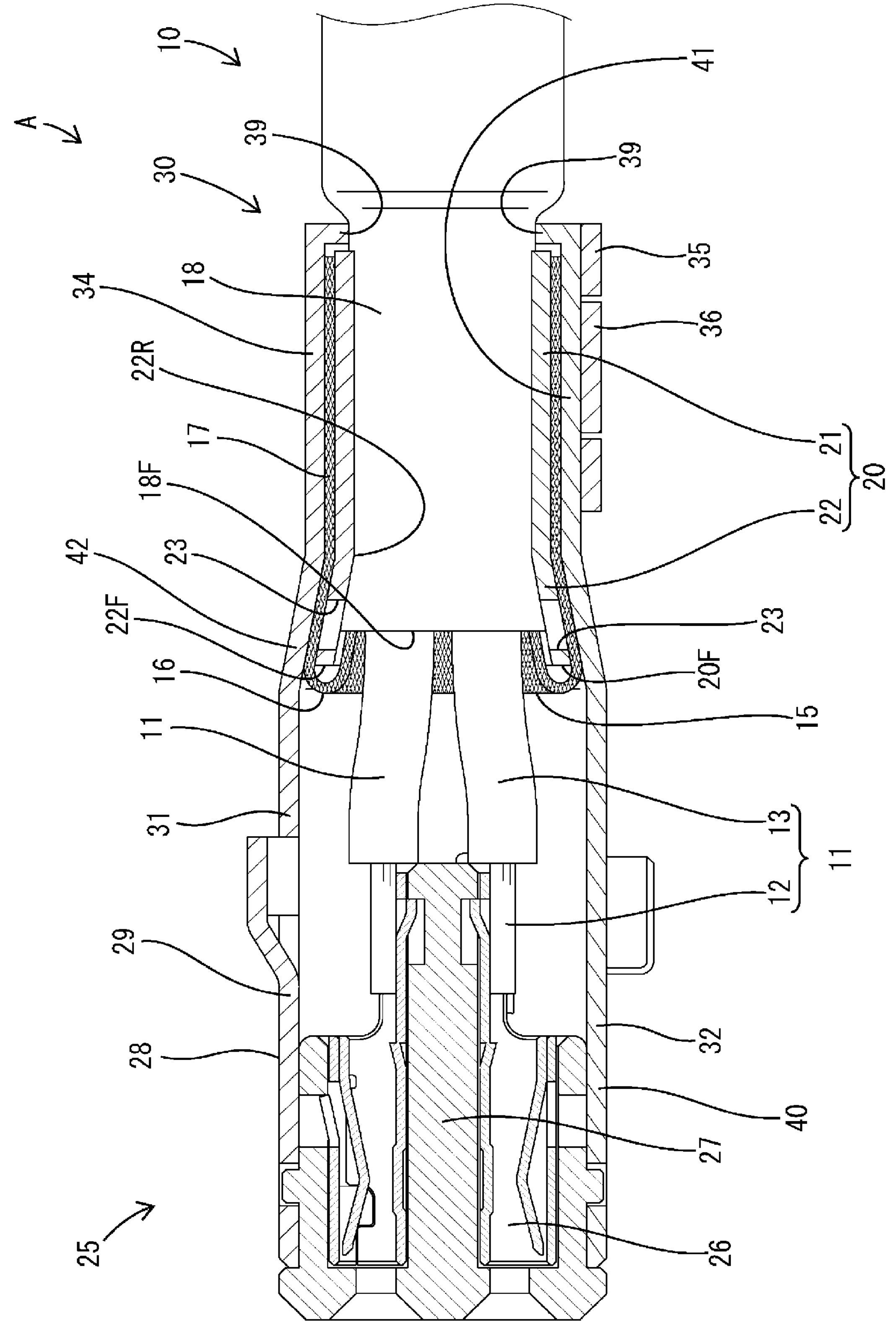
FIG. 2 is a section of the shielded electrically conductive path.
Figure 3:
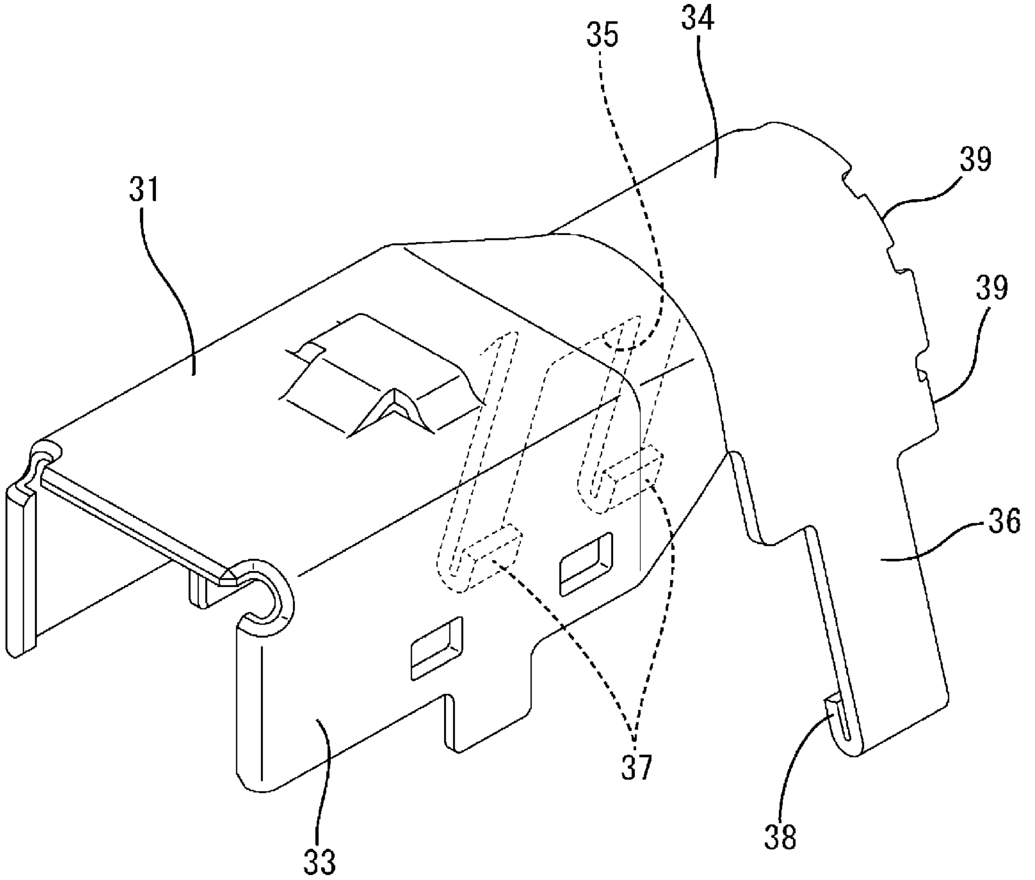
FIG. 3 is a perspective view of an upper shell.
Figure 4:
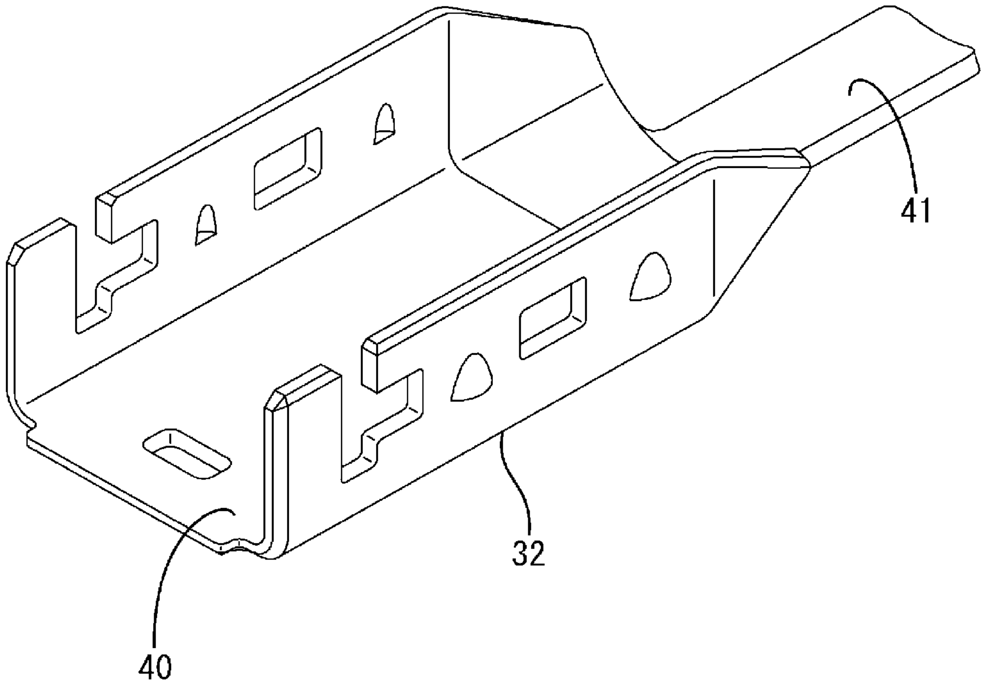
FIG. 4 is a perspective view of a lower shell.
Figure 5:
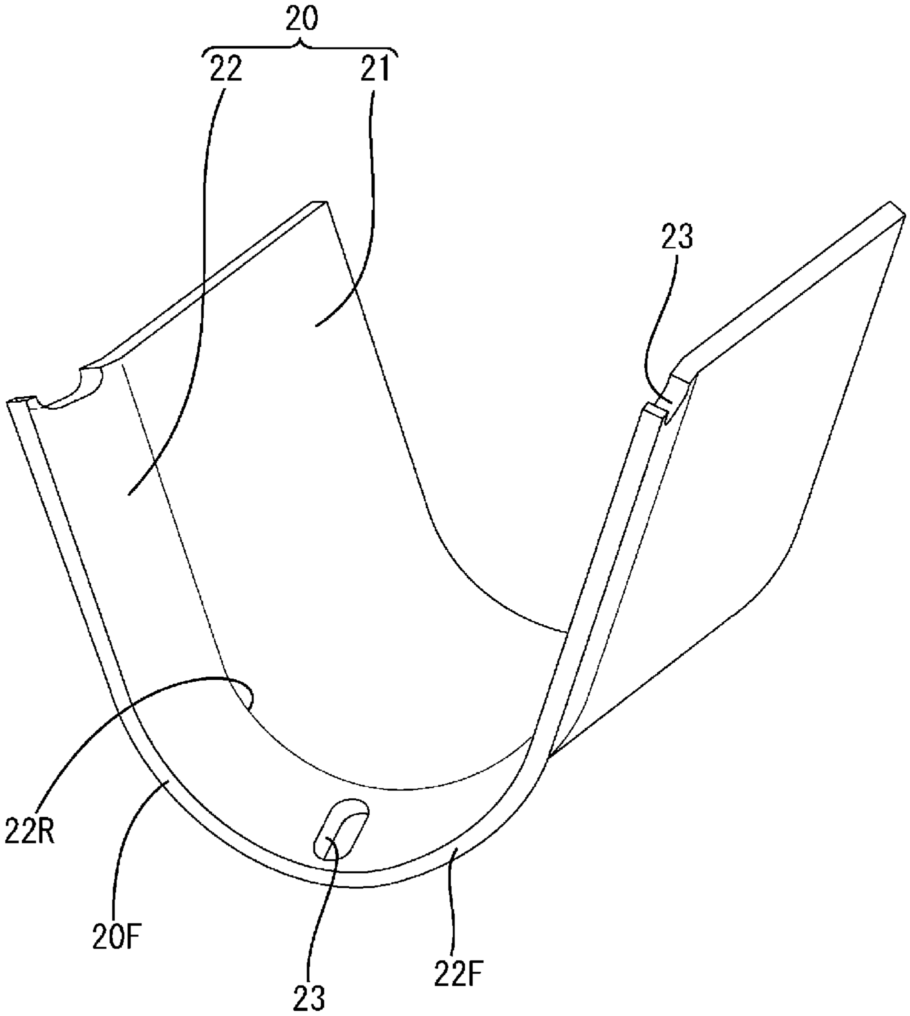
FIG. 5 is a perspective view of a sleeve in a state before being mounted on a shielded cable.
Figure 6:
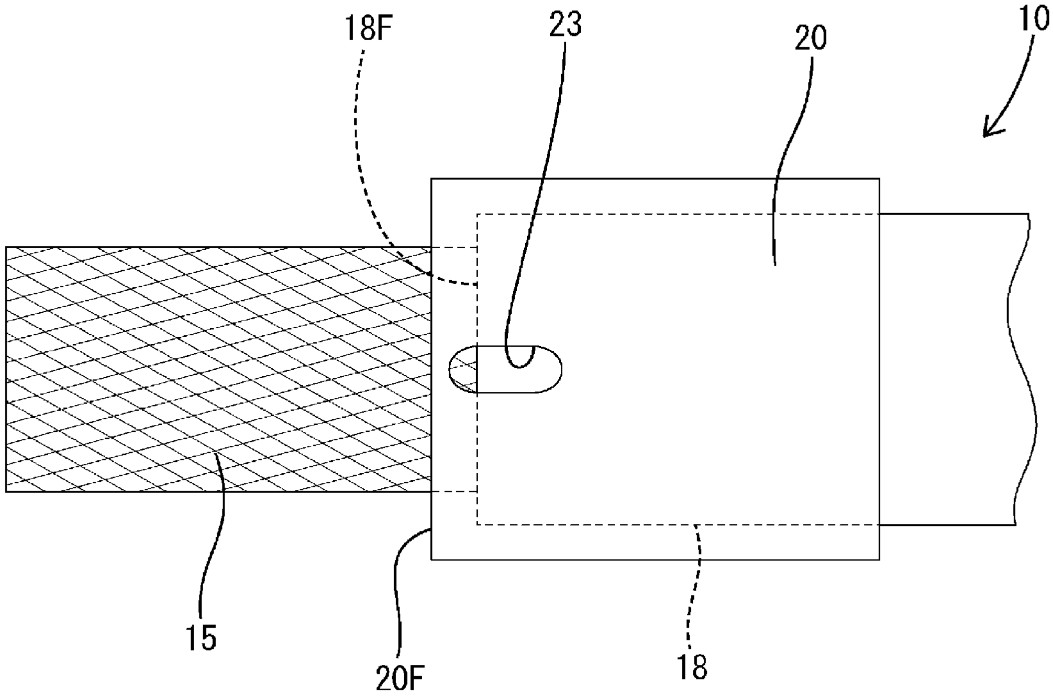
FIG. 6 is a plan view showing a state where the sleeve is externally fit to the shielded cable.

A first specific embodiment of a shielded electrically conductive path A of the present disclosure is described below with reference to FIGS. 1 to 6. Note that the present invention is not limited to these illustrations and is intended to be represented by claims and include all changes in the scope of claims and in the meaning and scope of equivalents. In this embodiment, an oblique left lower side in FIGS. 1, 3 and 4 and a left side in FIGS. 2 and 6 are defined as a front side concerning a front-rear direction. Upper and lower sides shown in FIGS. 1, 3 and 4 are directly defined as upper and lower sides concerning a vertical direction.

The shielded electrically conductive path A of the first embodiment includes a shielded cable 10, a sleeve 20 externally fit to the shielded cable 10 and a shield terminal 25 connected to a front end part of the shielded cable 10 using the sleeve 20.

The shielded cable 10 is such that a plurality of coated wires 11 are embedded in an insulating member (not shown) having a circular cross-section, the outer periphery of the insulating member is surrounded with a braided wire 15 having a shielding function, and the braided wire 15 is surrounded with a hollow cylindrical sheath 18. As shown in FIG. 2, the sheath 18 and the insulating member are removed in a front end part of the shielded cable 10, and the plurality of coated wires 11 are exposed forward of the insulating member in an individually bendable state. In a front end part of each coated wire 11, an insulation coating 13 is removed to expose a front end part of an electrically conductive core wire 12. The braided wire 15 is a flexible tubular member formed by braiding strands made of metal. A front end part of the braided wire 15 is exposed while extending further forward than a front end 18F of the sheath 18.

The electrically conductive sleeve 20 made of metal or the like is externally fit to the outer periphery of a front end part of the sheath 18. As shown in FIG. 5, the sleeve 20 is formed of a plate-like member having a constant width. The sleeve 20 is bent to have a hollow cylindrical shape with an axis oriented in the front-rear direction, and is externally fit to the front end part of the sheath 18 to surround the sheath 18 over an entire periphery. A front end 20F of the sleeve 20 is located forward of the front end 18F of the sheath 18. That is, a front end part of the sleeve 20 projects further forward than the front end 18F of the sheath 18.

The sleeve 20 bent into a hollow cylindrical shape includes a constant diameter portion 21 and an enlarged diameter portion 22. The constant diameter portion 21 has a hollow cylindrical shape having constant inner and outer diameters over an entire length in an axial direction. The expanded diameter portion 22 extends forward from the front end of the constant diameter portion 21. The expanded diameter portion 22 has such a tapered shape, i.e. a truncated conical shape that inner and outer diameters gradually increase toward the front. In the front-rear direction (axial direction of the shielded cable 10), the constant diameter portion 21 is entirely arranged in a region behind the front end 18F of the sheath 18. A rear end 22R of the expanded diameter portion 22 is located rearward of the front end 18F of the sheath 18, and a front end 22F of the expanded diameter portion 22 (i.e. front end 20F of the sleeve 20) is located forward of the front end 18F of the sheath 18.

As shown in FIG. 2, in a region behind an exposed region of the core wire 12, out of the front end part of the shielded cable 10, the front end part of the braided wire 15 is bent to turn rearward and toward an outer peripheral side near the front end 18F of the sheath 18. Out of the braided wire 15, a folded portion 17 rearward of a bent portion 16 covers the outer periphery of the sleeve 20. The bent portion 16 of the braided wire 15 is arranged at a position where the bent portion 16 is in contact with and caught by the front end 20F of the sleeve 20 or at a position where he bent portion 16 is proximately facing the front end 20F of the sleeve 20 from front.

The shield terminal 25 includes inner conductors 26 individually connected to front end parts of the core wires 12 of the respective coated wires 11, a dielectric 27 accommodating a plurality of the inner conductors 26 and an outer conductor 28 mounted on the dielectric 27 while surrounding the outer periphery of the dielectric 27. The outer conductor 28 functionally includes a shell body portion 29 in the form of a rectangular tube constituting a front end part of the outer conductor 28 and a hollow cylindrical crimping portion 30. The crimping portion 30 is connected to the rear end of the shell body portion 29 and constitutes a rear end part of the outer conductor 28. In terms of component configuration, the outer conductor 28 is configured by vertically uniting an upper shell 31 formed by applying bending and the like to a metal plate material and a lower shell 32 formed by applying bending and the like to a metal plate material.

As shown in FIG. 3, the upper shell 31 is a single component including an upper body portion 33 in the form of a box with an open lower surface, a base plate portion 34, a first crimp portion 35 and a second crimp portion 36. The base plate portion 34, the first crimp portion 35 and the second crimp portion 36 constitute the crimping portion 30. The base plate portion 34 extends rearward from the rear end edge of the upper body portion 33 and has an arched shape curved to bulge upward.

In a state where the crimping portion 30 (outer conductor 28) is not crimped to the shielded cable 10, the first crimp portion 35 extends obliquely to a right lower side along a circumferential direction from a right side edge part of the base plate portion 34. A pair of first locking portions 37 spaced apart in the front-rear direction are formed on an extending end part of the first crimp portion 35. In the state where the crimping portion 30 (outer conductor 28) is not crimped to the shielded cable 10, the second crimp portion 36 extends obliquely to a left lower side along the circumferential direction from a left side edge part of the base plate portion 34. A second locking portion 38 is formed on an extending end part of the second crimp portion 36.

A plurality of (four in the first embodiment) biting portions 39 are formed on the rear end edge of the crimping portion 30. The biting portion 39 is in the form of a projection formed by bending a part of a rear end edge part of the crimping portion 30 inwardly (in a direction toward the outer peripheral surface of the shielded cable 10). A pair of left and right biting portions 39 are formed on the rear end edge of the base plate portion 34, and one biting portion 39 is formed on each of the rear end edge of the first crimp portion 35 and the rear end edge of the second crimp portion 36.

The lower shell 32 is a single component including a lower body portion 40 in the form of a box with an open upper surface and a restricting portion 41. The restricting portion 41 is cantilevered rearward from the rear end edge of the lower body portion 40 and constitutes the crimping portion 30.

Next, the assembling of the shielded electrically conductive path A is described. If the upper shell 31 and the lower shell 32 are assembled to be vertically united, the upper body portion 33 and the lower body portion 40 are vertically united to sandwich the dielectric 27, whereby the shell body portion 29 in the form of a rectangular tube is configured. The entire dielectric 27 and the exposed regions of the coated wires 11 are accommodated in the shell body portion 29. In the state where the outer conductor 28 and the shielded cable 10 are not crimped, the base plate portion 34 of the crimping portion 30 and the restricting portion 41 are located to vertically sandwich the front end part of the shielded cable 10.

In this state, crimping is performed with the crimping portion 30 and the front end part of the shielded cable 10 set in an applicator (not shown). In a crimping step, the first and second crimp portions 35, 36 are deformed to be pressed against the outer periphery of the folded portion 17 of the braided wire 15 and the first and second locking portions 37, 38 are locked to the restricting portion 41 from opposite sides in the circumferential direction. By the locking action of the first and second locking portions 37, 38, the crimping portion 30 is crimped to the outer peripheries of the folded portion 17 of the braided wire 15 and the sleeve 20 and crimped to the shielded cable 10.

In a crimped state, at the same time as the folded portion 17 of the braided wire 15 is sandwiched between the inner peripheral surface of the crimping portion 30 and the outer peripheral surface of the sleeve 20 and the outer conductor 28 and the braided wire 15 are conductively connected, the outer conductor 28 and the shield terminal 25 are fixed to the shielded cable 10 with relative displacements in the front-rear direction restricted. Further, the biting portions 39 bite into the outer periphery of the sheath 18 at positions behind and very close to the sleeve 20. By this biting of the biting portions 39, relative displacements of the shielded cable 10 with respect to the crimping portion 30 in the front-rear direction and circumferential direction are prevented. In the above way, the connection of the shield terminal 25 and the shielded electrically conductive path A is completed at the same time as the assembling of the outer conductor 28 is completed.

If the crimping portion 30 of the outer conductor 28 is crimped to the front end part of the shielded cable 10, the sleeve 20 is slightly reduced in diameter and deformed by the crimping portion 30. Thus, a tapered portion 42 in conformity with the expanded diameter portion 22 of the sleeve 20 is formed in a part of the crimping portion 30 forward of the first and second crimp portions 35, 36. Further, by being slightly reduced in diameter and deformed by the crimping portion 30, the sleeve 20 comes into surface contact with an outer peripheral part of the sheath 18 such that the sheath 18 is reduced in diameter and deformed. A deformation amount to reduce the diameter of the sheath 18 by the sleeve 20 is such an amount as not to affect impedance matching. Out of the outer peripheral part of the sheath 18, a front end region reduced in diameter and deformed by the expanded diameter portion 22 has a tapered shape having an outer diameter increasing toward the front, similarly to the tapered shape of the inner peripheral surface of the expanded diameter portion 22.

If a crimping force by the crimping portion 30 is strengthened, the deformation amount to reduce the diameter of the sheath 18 by the sleeve 20 increases and the sleeve 20 and the sheath 18 are hardly relatively displaced in the front-rear direction. Thus, a fixing force of the crimping portion 30 to the shielded cable 10, i.e. a holding force by the crimping portion 30, increases. However, on the other hand, a radial distance between the core wire 12 and the braided wire 15 becomes largely different between a part of the sheath 18 reduced in diameter and deformed by the sleeve 20 and a part thereof not reduced in diameter and deformed. Thus, impedance mismatching occurs and communication performance is reduced.

Since the crimping force by the crimping portion 30 is suppressed to avoid a reduction in communication performance in the shielded electrically conductive path A of the first embodiment, there is a concern for a reduction in fixing force between the shield terminal 25 and the shielded cable 10. As a countermeasure against that, the expanded diameter portion 22 is formed in the front end part of the sleeve 20 and the front end part of the sheath 18 is held in close contact with the inner peripheral surface of the expanded diameter portion 22. Since the front end part of the sheath 18 comes into contact with and is caught by the inner peripheral surface of the tapered expanded diameter portion 22 from front when the shielded cable 10 is pulled rearward, a rearward relative displacement of the shielded cable 10 with respect to the shield terminal 25 can be prevented.

Further, the biting portions 39 formed on the crimping portion 30 are caused to bite into the outer peripheral part of the sheath 18 as a countermeasure in the case where a rearward pulling force applied to the shielded cable 10 exceeds a hooking force of the sheath 18 to the expanded diameter portion 22. When the shielded cable 10 is pulled rearward, the sheath 18 is caught by the biting portions 39, whereby a rearward relative displacement of the shielded cable 10 with respect to the shield terminal 25 can be prevented.

Further, the front end 20F of the sleeve 20 is arranged forward of the front end 18F of the sheath 18 and the bent portion 16 of the braided wire 15 is in contact with or proximately facing the front end 20F of the sleeve 20 as a countermeasure in the case where a rearward pulling force applied to the shielded cable 10 exceeds a locking force by the biting portions 39. According to such a positional relationship, if a rearward pulling force is applied to the shielded cable 10, the bent portion 16 of the braided wire 15 comes into contact with the front end 20F of the sleeve 20 from front. Since the folded portion 17 of the braided wire 15 is sandwiched between the sleeve 20 and the crimping portion 30, a rearward relative displacement of the shielded cable 10 can be reliably prevented by the bent portion 16 being caught by the front end 20F of the sleeve 20.

The shielded electrically conductive path A of the present disclosure is provided with the shield terminal 25, the shielded cable 10 and the sleeve 20. The shield terminal 25 includes the inner conductors 26 and the outer conductor 28 surrounding the inner conductors 26. The shielded cable 10 includes the core wires 12 fixed to the rear end parts of the inner conductors 26, the braided wire 15 surrounding the core wires 12 and the sheath 18 surrounding the braided wire 15. The sleeve 20 is mounted on the outer periphery of the front end part of the sheath 18. In the front end part of the shielded cable 10, the braided wire 15 extending from the front end 18F of the sheath 18 is folded rearward and put on the outer periphery of the sleeve 20. The crimping portion 30 in the rear end part of the outer conductor 28 is crimped to the sleeve 20 while surrounding the outer periphery of the folded portion 17 of the braided wire 15. The front end 20F of the sleeve 20 is located forward of the front end 18F of the sheath 18 in the front-rear direction.

If the crimping force by the crimping portion 30 is reduced to avoid a reduction in communication performance, the shielded cable 10 is relatively displaced rearward with respect to the outer conductor 28 and the sleeve 20 when a rearward pulling force is applied to the shielded cable 10. However, at the time of or immediately after the start of a relative displacement of the shielded cable 10, the bent portion 16 on the front end of the folded portion 17 of the braided wire 15 is caught by the front end 20F of the sleeve 20. Thus, a rearward relative displacement of the shielded cable 10 is hindered. Therefore, a reduction in communication performance can be prevented while a connected state of the shield terminal 25 and the shielded cable 10 is maintained.

If the crimping force by the crimping portion 30 is reduced, a fixing force between the sleeve 20 and the sheath 18 possibly becomes larger than that between the crimping portion 30 and the sleeve 20. In this case, when a rearward pulling force is applied to the shielded cable 10, the sleeve 20 is relatively displaced rearward with respect to the crimping portion 30 integrally with the shielded cable 10. However, since the expanded diameter portion 22 having a diameter increasing toward the front is formed on the front end 20F of the sleeve 20, the tapered outer peripheral surface of the expanded diameter portion 22 is caught by the inner peripheral surface of the tapered portion 42 of the crimping portion 30 via the folded portion 17 of the braided wire 15. In this way, a rearward relative displacement of the sleeve 20 with respect to the crimping portion 30 is prevented.

The rear end 22R of the expanded diameter portion 22 is located rearward of the front end 18F of the sheath 18. According to this configuration, when a rearward pulling force is applied to the shielded cable 10, the front end part of the sheath 18 is caught by the inner peripheral surface of the expanded diameter portion 22, whereby a rearward relative displacement of the shielded cable 10 can be prevented.

Since the crimping portion 30 is formed with the biting portions 39 configured to come into contact with and bite into the sheath 18, a rearward relative displacement of the shielded cable 10 with respect to the shield terminal 25 can be prevented by the biting action of the biting portions 39.

The front end 20F of the sleeve 20 is located forward of the front end 18F of the sheath 18. Thus, with the sheath 18 put on the sleeve 20, a positional relationship of the sleeve 20 with the sheath 18 in the front-rear direction is unknown. As a countermeasure against that, the front end part of the sleeve 20 is formed with cut portions 23 for exposing the front end 18F of the sheath 18 to an outer peripheral surface side of the sleeve 20.

As shown in FIG. 6, the cut portion 23 is in the form of a window hole having an elliptical opening long in the front-rear direction and an opening edge continuous over an entire periphery. Accordingly, the cut portion 23 is not open in the front end 20F of the sleeve 20. If the front end 18F of the sheath 18 is located in an opening region when the cut portion 23 is viewed from an outer peripheral side of the sleeve 20, a positional relationship of the front end 20F of the sleeve 20 and the front end 18F of the sheath 18 can be confirmed through the cut portion 23. In this way, the sleeve 20 can be arranged at a proper position with respect to the sheath 18.

Second Embodiment

Figure 7:
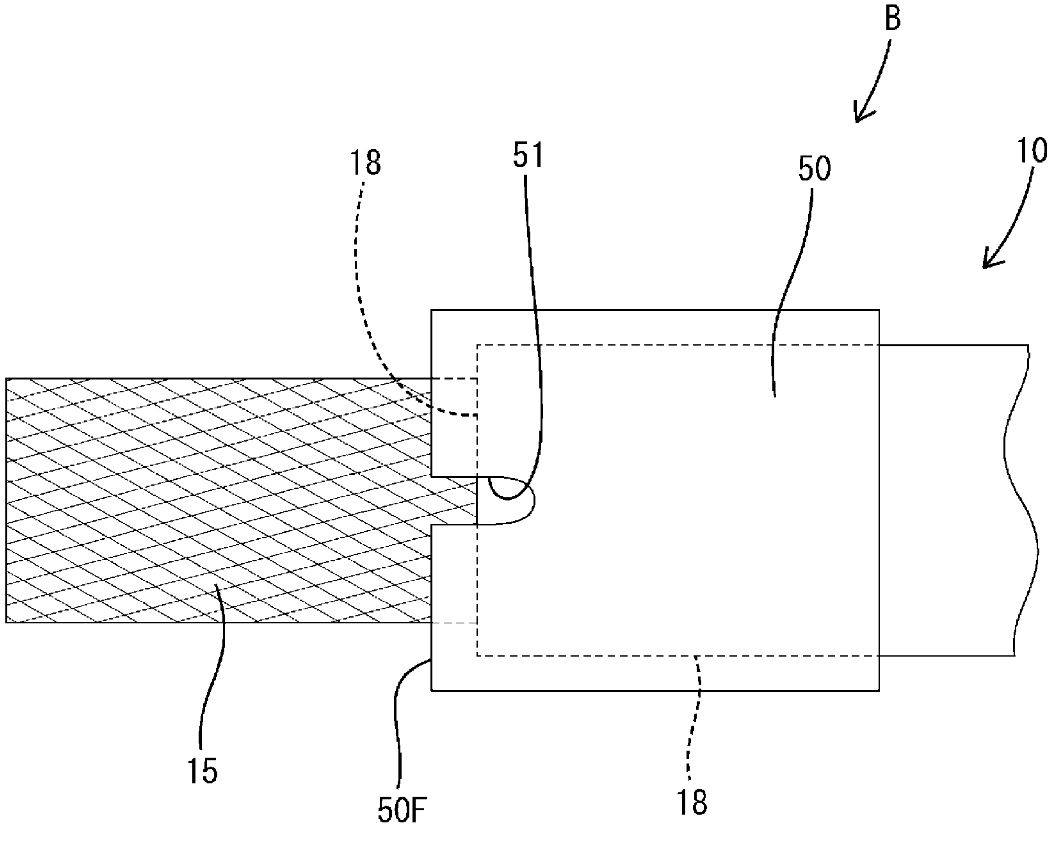
FIG. 7 is a plan view showing a state where a sleeve is externally fit to a shielded cable in a second embodiment.

A second specific embodiment of the present disclosure is described with reference to FIG. 7. A shielded electrically conductive path B of the second embodiment is different in configuration from the first embodiment in a cut portion 50 formed in a sleeve 50. Since the other configuration is the same as in the first embodiment, the same components are denoted by the same reference signs and the structures, functions and effects thereof are not described.

The cut portion 51 of the second embodiment is an opening elongated in the front-rear direction. The front end of the cut portion 51 is open in a front end 50F of the sleeve 50. Accordingly, even if the front end 50F of the sleeve 50 is arranged at the same position as a front end 18F of a sheath 18 in the front-rear direction, a positional relationship of the front end 50F of the sleeve 50 and the front end 18F of the sheath 18 can be confirmed in the cut portion 51.

Other Embodiments

The present invention is not limited by the above described and illustrated embodiments, but is represented by claims. The present invention is intended to include all changes in the scope of claims and in the meaning and scope of equivalents and also include the following embodiments.

Although the expanded diameter portion is formed in the front end part of the sleeve in the above first and second embodiments, the sleeve may include no expanded diameter portion.

Although the rear end of the expanded diameter portion is located rearward of the front end of the sheath in the above first and second embodiments, the rear end of the expanded diameter portion may be arranged at a position forward of the front end of the sheath or may be arranged at the same position as the front end of the sheath when the front end of the sleeve is located forward of the front end of the sheath.

Although the crimping portion is formed with the biting portions in the above first and second embodiments, the crimping portion may include no biting portions.

Although the sleeve is formed with the cut portions in the above first and second embodiments, the sleeve may include no cut portions.

Although the sleeve is of an open type to be mounted by winding a member in the form of a flat plate on the shielded cable in the above first and second embodiments, the sleeve may be of a closed type formed into a hollow cylindrical shape.

Although the front end of the sleeve is arranged forward of the front end of the sheath in the above first and second embodiments, the front end of the sleeve may be arranged at the same position as the front end of the sheath in the front-rear direction.

LIST OF REFERENCE NUMERALS

10 . . . shielded cable
11 . . . coated wire
12 . . . core wire
13 . . . insulation coating
15 . . . braided wire
16 . . . bent portion
17 . . . folded portion
18 . . . sheath
18F . . . front end of sheath
20 . . . sleeve
20F . . . front end of sleeve
21 . . . constant diameter portion
22 . . . expanded diameter portion
22F . . . front end of expanded diameter portion
22R . . . rear end of expanded diameter portion
23 . . . cut portion
25 . . . shield terminal
26 . . . inner conductor
27 . . . dielectric
28 . . . outer conductor
29 . . . shell body portion
30 . . . crimping portion
31 . . . upper shell
32 . . . lower shell
33 . . . upper body portion
34 . . . base plate portion
35 . . . first crimp portion
36 . . . second crimp portion
37 . . . first locking portion
38 . . . second locking portion
39 . . . biting portion
40 . . . lower body portion
41 . . . restricting portion
42 . . . tapered portion
50 . . . sleeve
50F . . . front end of sleeve
51 . . . cut portion
A . . . shielded electrically conductive path
B . . . shielded electrically conductive path

What is claimed is:

1. A shielded electrically conductive path, comprising:

a shield terminal including an inner conductor and an outer conductor surrounding the inner conductor;

a shielded cable including a core wire fixed to a rear end part of the inner conductor, a braided wire surrounding the core wire and a sheath surrounding the braided wire; and a sleeve mounted on an outer periphery of a front end part of the sheath, the braided wire extending from a front end of the sheath being folded rearward and put on an outer periphery of the sleeve and a crimping portion in a rear end part of the outer conductor being crimped to the sleeve while surrounding an outer periphery of a folded portion of the braided wire in a front end part of the shielded cable, and a front end of the sleeve being located at the same position as or forward of the front end of the sheath in a front-rear direction, wherein the front end of the sleeve is located forward of the front end of the sheath, and the sleeve is formed with a cut portion for exposing the front end of the sheath to an outer peripheral surface side of the sleeve.

2. The shielded electrically conductive path of claim 1, wherein the crimping portion is formed with a biting portion configured to come into contact with and bite into the sheath.

3. The shielded electrically conductive path of claim 1, wherein an expanded diameter portion having a diameter increasing toward front is formed in a front end part of the sleeve.

4. The shielded electrically conductive path of claim 3, wherein a rear end of the expanded diameter portion is located rearward of the front end of the sheath.

5. A shielded electrically conductive path, comprising:

a shield terminal including an inner conductor and an outer conductor surrounding the inner conductor;

a shielded cable including a core wire fixed to a rear end part of the inner conductor, a braided wire surrounding the core wire and a sheath surrounding the braided wire; and a sleeve mounted on an outer periphery of a front end part of the sheath, the braided wire extending from a front end of the sheath being folded rearward and put on an outer periphery of the sleeve and a crimping portion in a rear end part of the outer conductor being crimped to the sleeve while surrounding an outer periphery of a folded portion of the braided wire in a front end part of the shielded cable, and a front end of the sleeve being located at the same position as or forward of the front end of the sheath in a front-rear direction, wherein the sleeve is formed with a cut portion for exposing the front end of the sheath to an outer peripheral surface side of the sleeve.

6. The shielded electrically conductive path of claim 5, wherein the crimping portion is formed with a biting portion configured to come into contact with and bite into the sheath.

7. The shielded electrically conductive path of claim 5, wherein an expanded diameter portion having a diameter increasing toward front is formed in a front end part of the sleeve.

8. The shielded electrically conductive path of claim 7, wherein a rear end of the expanded diameter portion is located rearward of the front end of the sheath.

* * * * *